(12) United States Patent
Harmatos

(10) Patent No.: US 8,750,125 B2
(45) Date of Patent: Jun. 10, 2014

(54) METHOD AND ARRANGEMENT FOR SCHEDULING DATA PACKETS IN A COMMUNICATION NETWORK SYSTEM

(75) Inventor: János Harmatos, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 480 days.

(21) Appl. No.: 12/738,699

(22) PCT Filed: Oct. 19, 2007

(86) PCT No.: PCT/SE2007/050761
§ 371 (c)(1),
(2), (4) Date: Apr. 19, 2010

(87) PCT Pub. No.: WO2009/051533
PCT Pub. Date: Apr. 23, 2009

(65) Prior Publication Data
US 2010/0208614 A1    Aug. 19, 2010

(51) Int. Cl.
*H04L 12/26* (2006.01)
*H04L 12/56* (2006.01)

(52) U.S. Cl.
CPC .................................. *H04L 47/215* (2013.01)
USPC ....................................................... 370/235.1

(58) Field of Classification Search
USPC ..................... 370/229–239, 395.2, 351–429; 709/225–235
See application file for complete search history.

(56) References Cited

U.S. PATENT DOCUMENTS

| | | | |
|---|---|---|---|
| 6,532,213 B1 * | 3/2003 | Chiussi et al. | 370/230.1 |
| 7,310,309 B1 * | 12/2007 | Xu | 370/230.1 |
| 7,719,968 B2 * | 5/2010 | Swenson et al. | 370/229 |
| 7,724,760 B2 * | 5/2010 | Balakrishnan et al. | 370/416 |
| 7,782,776 B2 * | 8/2010 | Shankar et al. | 370/234 |
| 8,064,382 B2 * | 11/2011 | Zisimopoulos et al. | 370/322 |
| 8,121,033 B2 * | 2/2012 | Compton et al. | 370/235 |
| 2002/0114334 A1 * | 8/2002 | Yang | 370/395.1 |
| 2003/0069970 A1 * | 4/2003 | Kim et al. | 709/225 |
| 2003/0223370 A1 * | 12/2003 | Jain et al. | 370/235 |
| 2004/0062259 A1 * | 4/2004 | Jeffries et al. | 370/412 |
| 2004/0151184 A1 * | 8/2004 | Wang et al. | 370/395.2 |
| 2005/0068798 A1 * | 3/2005 | Lee et al. | 365/49 |
| 2005/0169172 A1 * | 8/2005 | Wang et al. | 370/229 |
| 2006/0146710 A1 * | 7/2006 | Roy | 370/235 |
| 2006/0215558 A1 * | 9/2006 | Chow | 370/232 |
| 2007/0076621 A1 * | 4/2007 | Malhotra et al. | 370/252 |
| 2007/0109968 A1 * | 5/2007 | Hussain et al. | 370/232 |
| 2008/0151751 A1 * | 6/2008 | Ponnuswamy et al. | 370/232 |

OTHER PUBLICATIONS

Francesco Delli Priscoli et al: "QOS Provisioning in Wireless IP Networks", Wireless Personal Comnunications, Kluwer Academic Publishers, DO, vol. 37: No. 1-2, Apr. 1, 2886.

* cited by examiner

*Primary Examiner* — Kwang B Yao

(57) ABSTRACT

The present invention relates to a method and an arrangement for scheduling data packets each belonging to a particular traffic class associated with a certain quality of service (QoS) level and transmitted between a first communication network node and a second communication network node. Initially a token rate for assigning tokens to each traffic class is set and an incoming traffic rate of each traffic class is measured by counting a number of incoming data packets during a predetermined period of time. Then, based on said measured incoming traffic rate said token rate is adjusted in order to obtain a fair scheduling of data packets belonging to different traffic classes.

4 Claims, 6 Drawing Sheets

METHOD AND ARRANGEMENT FOR SCHEDULING DATA PACKETS IN A COMMUNICATION NETWORK SYSTEM

TECHNICAL FIELD

The present invention relates to a method and an arrangement in a communication network system and, more particularly, to an arrangement allowing for scheduling data packets as well as a method for such scheduling.

BACKGROUND

To provide sufficient quality of service (QoS) in an effective, but simple way is an important issue in the third generation partnership project (3GPP) standardization. In Rel 8 of this standard, the QoS concept is revised and the main difference from the previous concept is that network initiated QoS profile is introduced and the number of signaled parameters over the radio access network (RAN) is significantly reduced. When a new session is starting then the session initiation protocol/service discovery protocol (SIP/SDP) is used to signal the QoS needs to the proxy call session control function (P-CSCF). Then the policy and charging rules function (PCRF), using subscription data, formulates the proper QoS profile and forwards it to the relevant nodes in the core network (CN) and RAN.

The QoS profile contains the so-called Label parameter, the Allocation Retention Priority (ARP) parameter, and the uplink-downlink (UL-DL) Maximum and Guaranteed Bitrate (MBR, GBR). The Label is a simply integer (or pointer), which specify a certain QoS class, and it is associated with a set of QoS parameters in the radio base station (RBS), which are configured by the operator via the operations support system (OSS). Two main types of Labels can be distinguished: GBR Labels, where the RAN has to perform admission control; and Non-GBR Label, which provides a best-effort type service. The allocation retention priority (ARP) specifies the importance of the bearer setup/modification request from the core network. The MBR specifies the maximum rate that may be given to this bearer in uplink/downlink respectively. The GBR specifies the bit-rate that the RAN should "guarantee" to have available for this bearer.

Obviously, the basic condition of providing the sufficient QoS is to handle the RBS resources properly, according to the QoS concept.

FIG. 1 shows how the RBS capacity is divided among the different types of services. The diagram shows the served traffic, ST, as a function of time, t. The area of the diagram denoted 10 is the served traffic of GBR bearers, which is the same as the traffic load of the GBR bearers and, the area denoted 12 is the served traffic of the non-GBR bearers, which is less than or the same as the traffic load of the non-GBR bearers. 18 illustrates the aggregated cell capacity as a function of all radio resources and all active users' location. In the following the main properties of the RBS capacity management according to the QoS concept is summarized:

Basically, the RBS capacity is divided into two main parts, namely GBR capacity 14, which is fixed and Non-GBR capacity 15 which varies (mapping according to the Label). This division is allowed by the so-called AAT (Absolute Admission Threshold), denoted with 16 and which defines a load-level (measured in kbps) which the aggregate GBR traffic should not exceed during an average time period;

The GBR traffic should be proceed by CAC function using the QoS descriptor, the current GBR load on the RBS and the AAT value;

Both GBR and Non-GBR part of capacity can be divided further into so-called GBR and Non-GBR partitions;

In case of GBR traffic an absolute capacity threshold (like independent AATs) can be defined for each partition;

The non-reserved part of the GBR traffic is distributed among the Non-GBR partitions. Hence the capacity for Non-GBR traffic is time varying, so absolute thresholds for the partitions cannot be defined. Instead the Relative Committed Rate (RCR) is introduced, which is used to specify the percentage of the total currently available capacity for each Non-GBR partition;

If a non-GBR partition is not fully utilized, then other non-GBR partitions may share the available resources among them, according to their RCR value.

The long term evolution (LTE) RAN consists of the following entities: a user equipment (UE), an air interface between the UE and a radio base station (eNodeB), eNodeB and a RAN transport network with different types of transport equipments between the eNodeB and the CN.

In order to guarantee the sufficient QoS in the LTE RAN adequate scheduling/queuing/resource allocation mechanism and techniques are needed between the UE and the CN. Basically the UE-CN connection may be distinguished into two main parts: UE-eNodeB and eNodeB-CN (which herein is called the LTE RAN transport network) connections.

Between the UE and the eNodeB, the QoS is guaranteed by the UE and eNodeB using proper scheduling mechanisms.

Since the RAN transport network consists of standard (third party) equipments, the QoS may be guaranteed only by using the existing and standardized functions on a proper way.

FIG. 2 shows a simplified view of the LTE RAN transport network. The eNodeBs 21 (two are shown in FIG. 2) are communicating with the CN 23 via the IP/Ethernet 24 over the S1 interface 25, which is used to realize the transport connections between the eNodeBs 21 and the CN 23. The X2 interface 26 is used to realize the transport connections between any two neighbouring eNodeBs 21. Neither the S1 interlace 25 nor the X2 interface 26 has flow control. A network management system 28, such as the OSS-RC, manages the eNodeBs 21 over the Mub interface 29.

The sufficient QoS in the LTE RAN transport network may be provided in the following ways:

Simple priority queuing: On IP level the differentiated services code point (DSCP) field, while on Ethernet level the p-bits may carry priority information, which is considered in case of scheduling in the transport nodes. Different types of priority queuing mechanisms may be used, like strict priority queuing, weighted fair queuing (WFQ), etc. In WFQ, the resources are shared between the different queues according to their weight. The unused resources are divided between the queues which needs more resources according to their weights.

Signalled provisioning: which means that a radio bearer/access bearer (RB/AB) may only be established when the required transport capacity is available. The main issues here are the on-line monitoring of transport resources, informing the radio level connection admission control (CAC) about the result of transport level CAC, and reserving the sufficient transport resources;

Bandwidth broker: in this case the CAC decision and network resource handling is provided by the bandwidth broker, but obviously it requires an extra equipment in the network;

Static provisioning: A simple CAC mechanism is needed into edge eNodeBs and CNs, but correct operation is guaranteed only by using proper network dimensioning. This solution—from its static behaviour—cannot react to the extraordinary situations;

Over dimensioning: CAC is not required, however network utilization is very low, and extraordinary situations cannot be handled.

The above presented solutions—although those are able to guarantee some QoS level—cannot work together with the LTE QoS concept because of the following reasons:

Priority queuing provides only simple differentiation but it does not provide any bandwidth guarantee, which is a basic requirement for fulfilling the LTE QoS concept;

Signalled provisioning, bandwidth broker based solution and static provisioning is not considered, because it requires extra interaction between the transport and the LTE devices;

Over provisioning is also not sufficient, because it cannot provide the sufficient QoS level on a cost effective way.

To guarantee proper QoS three main tasks should be solved:

Correct mapping of radio level QoS information onto transport level QoS fields (in this case these are DSCP or/and p-bit field);

Proper transport network dimensioning according to the LTE QoS concept;

Proper queuing/scheduling mechanism in the transport nodes for providing the same traffic classification as in the LTE QoS concept.

Mapping

If any different GBR or Non-GBR partitions are mapped to the same DSCP or p-bit value then the QoS concept cannot be guaranteed, because in case of packet dropping there is no way to distinguish the traffic partitions in the transport node, so the individual dropping probability cannot be guaranteed any more.

Network Dimensioning

The transport network has been dimensioned such that the GBR traffic may be handled in any network situation. Since the Non-GBR traffic is a best-effort type of service the non-GBR partitions do not have any minimum bandwidth requirement in the transport network.

Priority Queuing

The main problems with the priority queuing mechanisms are the following:

Strict priority queuing is not sufficient, because it does not make it possible to share the available bandwidth among the different traffic partitions according to the LTE QoS concept. The high priority traffic may eat the radio resources.

Typically the transport network is not dimensioned for peak cell rate, because the statistical multiplexing gain is considered. However, in this case the other queuing mechanisms, like WFQ cannot guarantee the QoS classification in the transport network according to the RBS resource distribution.

The critical problem is that the current priority queuing/scheduling mechanisms are not enough to provide the LTE QoS concept. The problem appears if more than one Non-GBR traffic partitions are used and the available transport capacity is less than the aggregate traffic of the eNodeBs (the transport is a bottleneck). In this case packet loss occurs, however the current priority queuing schemes are not able to provide the same packet loss—in a fair way—for all Non-GBR traffic partitions, as seen from the following simple example, shown in conjunction with FIG. 3. FIG. 3 shows a first eNodeB 21a and a second eNodeB 21b. Both eNodeBs handles 120 Mbit/s traffic. The first eNodeB 21a is connected to an Ethernet switch 32 in the transport network with a link A having a capacity of 100 Mbps and the second eNodeB 21b is connected to the 32 with a link B having a capacity of 100 Mbps. The 32 further has a link C connected to an upper level node having a capacity of 180 Mbps. The terms $GBR^1$, $GBR^2$ are the GBR traffic from eNodeB1 and eNodeB2 respectively, $NGBR^1_1$, $NGBR^2_1$ are the Non-GBR traffic from eNodeB1 and eNodeB2 respectively for partition 1 and, $NGBR^1_2$ and $NGBR^2_2$ are the Non-GBR traffic from eNodeB1 and eNodeB2 respectively for partition 1.

Both eNodeBs 21a, 21b are able to generate 120 Mbps peak traffic. The capacity handling in both eNodeBs is the same:

| eNodeB 1 and eNodeB 2 | Capacity |
|---|---|
| Capacity for GBR traffic ($GBR^1$, $GBR^2$) | 20 Mbit/s |
| Capacity for Non-GBR partition 1 ($NGBR^1_1$, $NGBR^2_1$) | 50 Mbit/s |
| Capacity for Non-GBR partition 2 ($NGBR^1_2$, $NGBR^2_2$) | 50 Mbit/s |
| Total capacity | 120 Mbit/s |

According to the QoS concept the link capacities will be divided between the different traffic partitions according to the following way:

| | GBR traffic | NGBR partitions | Total capacity |
|---|---|---|---|
| Link A and B | 20 Mbit/s | 40 Mbit/s for each | 100 Mbit/s |
| Link C | 40 Mbit/s | 70 Mbit/s for each | 180 Mbit/s |

Taking the following traffic situation:

| | | | |
|---|---|---|---|
| eNodeB 1 | $GBR^1$ | $NGBR^1_1$ | $NGBR^1_2$ |
| | 0 Mbit/s | 100 Mbit/s | 20 Mbit/s |
| eNodeB 2 | $GBR^2$ | $NGBR^2_1$ | $NGBR^2_2$ |
| | 0 Mbit/s | 60 Mbit/s | 60 Mbit/s |

All traffic can be served by the eNodeBs 21a, 21b, however the transport network is a bottleneck. The loss for the NGBR classes is on link A and B, respectively:

| | | |
|---|---|---|
| Link A | $NGBR^1_1$ | $NGBR^1_2$ |
| | 20% (100 Mbit/s → 80 Mbit/s) | 0% (20 Mbit/s → 20 Mbit/s) |
| Link B | $NGBR^2_1$ | $NGBR^2_2$ |
| | 17% (60 Mbit/s → 50 Mbit/s) | 17% (60 Mbit/s → 50 Mbit/s) |

The loss for the aggregated traffic of the NGBR classes on link C, assuming that both eNodeB's traffic receive equal traffic loss. The reference capacity for the loss value is the original traffic.

| | | |
|---|---|---|
| Link C | $NGBR^1_1$ | $NGBR^1_2$ |
| | 33.32% (100 Mbit/s → 67.68 Mbit/s) | 0% (20 Mbit/s → 20 Mbit/s) |
| | $NGBR^2_1$ | $NGBR^2_2$ |
| | 20% (60 Mbit/s → 42.32 Mbit/s) | 17% (60 Mbit/s → 50 Mbit/s) |

To see the loss values of the table it is clearly seen that using fixed scheduling weights in the transport network results in a completely unfair capacity handling, because the different traffic classes receive different loss in the transport. The fair solution would be if all traffic classes receive the same loss, which in this case is 25% (240 Mbits/s→180 Mbit/s).

One main problem is that the eNodeB resources may be allocated to the different Non-GBR classes in a very flexible way, which cannot be reproduced by the standard scheduling mechanisms, like WFQ.

A possible way could be if the WFQ weight system is periodically updated according to the current traffic situation in the eNodeBs. However this solution has several significant drawbacks:

All bearer establishment/modification/release require WFQ weight updates in some transport nodes.

The above modification process requires a central entity, which maintains an actual resource database for the transport network and it is responsible for process all configuration changes that are required.

Information changing is needed between the eNodeBs (mobile network) and the transport network (configuration of transport nodes), which could be problematic if the mobile and transport networks are in the hand of different operators.

Consequently, a solution is needed, which does not require any on-line cooperation between the base station and transport devices.

SUMMARY

Accordingly, it is an objective with the present invention to provide an improved method of scheduling data packets each belonging to a particular traffic class associated with a certain quality of service (QoS) level and transmitted between a first communication network node and a second communication network node.

According to a first aspect of the present invention this objective is achieved through a method as defined in the characterising portion of claim 1, which specifies that the scheduling of data packets is provided by a method in which a token rate for assigning tokens to each traffic class is initially set, an incoming traffic rate of each traffic class is measured by counting a number of incoming data packets during a pre-determined period of time and, said token rate is adjusted based on said measured incoming traffic rate, in order to obtain a fair scheduling of data packets belonging to different traffic classes.

Another objective with the present invention is to provide an improved arrangement for scheduling data packets each belonging to a particular traffic class associated with a certain quality of service (QoS) level and transmitted between a first communication network node and a second communication network node.

According to a second aspect of the present invention this other objective is achieved through an arrangement according to the characterising portion of claim 7, which specifies that scheduling of data packets is provided by an arrangement which comprises means for measuring an incoming traffic rate of each traffic class by counting a number of incoming data packets during a pre-determined period of time and means for initially setting a token rate for assigning tokens to each traffic class and for adjusting said token rate based on said measured incoming traffic rate, in order to obtain a fair scheduling of data packets belonging to different traffic classes.

Further embodiments are listed in the dependent claims.

Thanks to the provision of a method and an arrangement, which provide a QoS handling between the user equipment and the access gateways, a fair resource handling among different traffic classes is obtained.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
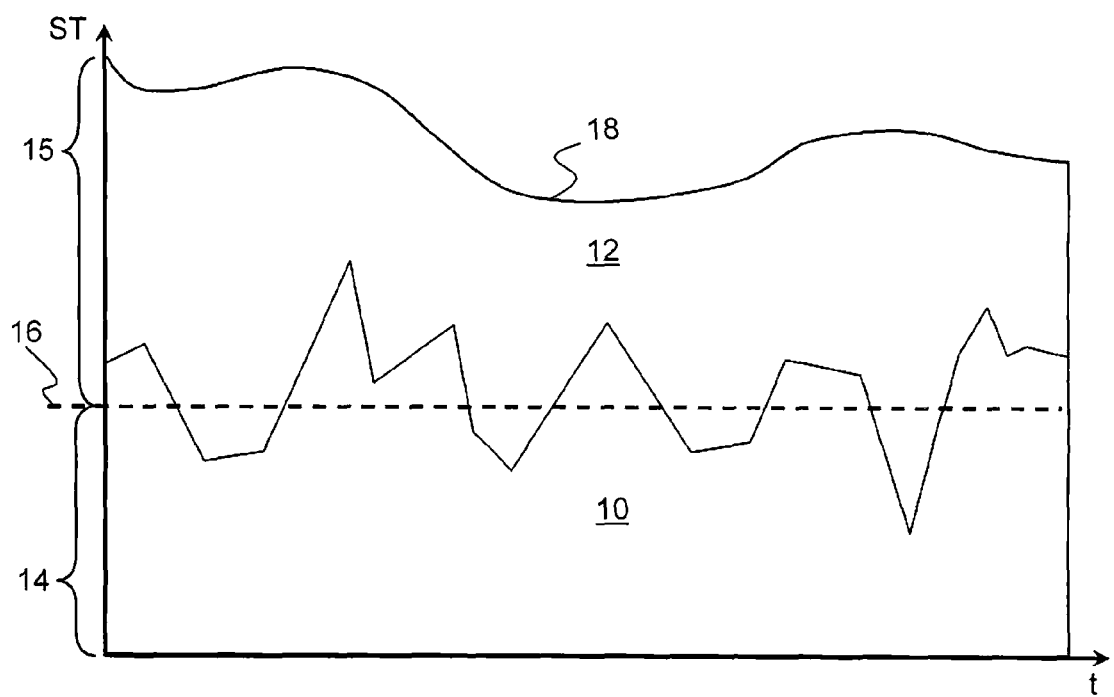
FIG. 1 is a diagram of the handling of the aggregate RBS capacity in LTE QoS concept.
Figure 2:
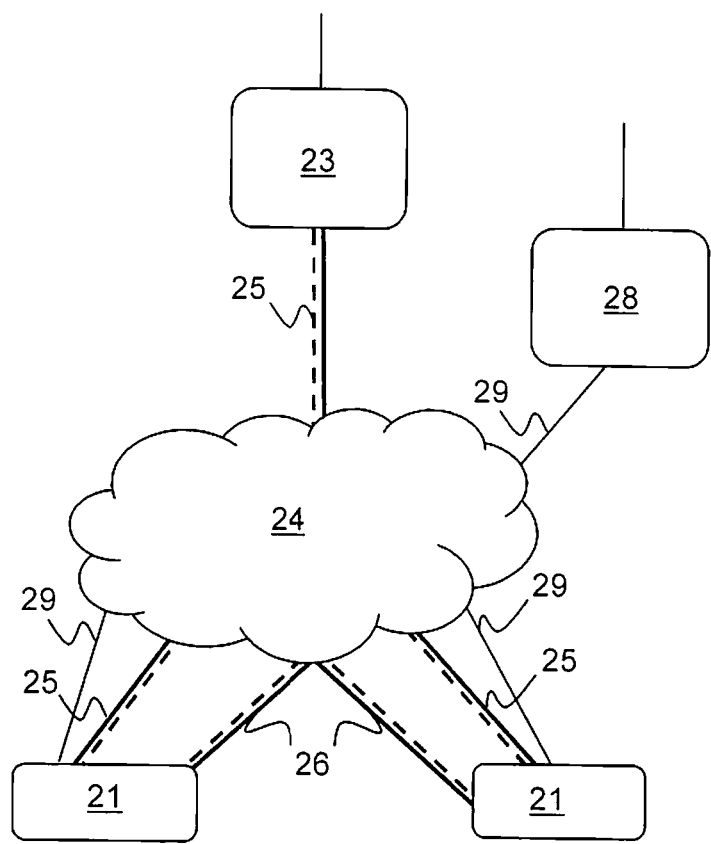
FIG. 2 shows a simplified view of the LTE RAN transport system.

A communication system, such as a Long Term Evolution (LTE) system shown in FIG. 2, including a Radio Access Network (RAN), comprising at least one Radio Base Station (RBS) (or eNode B) 21. The RAN is connected over an interface such as the S1-interface 25 to a mobile core 23, which is connected over the Gi-interface to the external networks such as the Public Switched Telephone Network (PSTN) or the Integrated Services Digital Network (ISDN), and/or a connectionless external network as the Internet.

The RAN and the mobile core provide communication and control for a plurality of user equipments (UE). The UEs each uses downlink (DL) channels and uplink (UL) channels to communicate with at least one RBS over a radio or air interface.

According to a preferred embodiment of the present invention, the communication system is herein described as a LTE system. The skilled person, however, realizes that the inventive method and arrangement works very well on other communications systems as well and may be applied in WLAN, Bluetooth, WiMAX etc, The user equipments may be mobile stations such as mobile telephones ("cellular" telephones) and laptops with mobile termination and thus can be, for example, portable, pocket, hand-held, computer-included or car-mounted mobile devices which communicate voice and/or data with the RAN.

The main goal of the present invention is to provide an architecture and scheduling concept for transport devices (routers, switches) using priority queuing, which provides that the RAN transport will be able to guarantee QoS according to the LTE QoS concept.

The invention also proposes a mapping between packets belonging to different traffic partitions of eNodeBs and appropriate DSCP and p-bit values. The basic rule is that all different traffic partitions need to map different DSCP/p-bit value in order to provide the differentiation among them in the transport network devices.

A simple transport network dimensioning rule of thumb is also presented, which is sufficient for realizing the correct LTE QoS concept by the transport network. The capacity of a current link is at least the sum of the AAT values of the eNodeBs, which are served by the current link; this is needed to serve the guaranteed bit-rate services in any case (failure situations are not considered). In case of tree topology it is a simple summarization, however, in case of more generic (e.g. two-connected network) in the knowledge of the routing strategy the transport links may also be dimensioned in a simple way. Obviously, the Non-GBR services should also be considered, however, in this case statistical multiplexing gain may be applied.

As main part of the invention a scheduling mechanism is described, which is able to provide fair scheduling between the packets belonging to different traffic partitions. The essence of the mechanism is that the resource reservation in the transport devices is depending on the current incoming (short-term, second scale) average rate of the different traffic classes, instead of the pre-defined weights. The scheduling method is based on the fact that the calls are accepted by the eNodeB, according to the current offered traffic by the users and the radio/eNodeB resources and the incoming traffic into the LTE transport network is already shaped in the eNodeB. Consequently, the role of the transport network should be a) forward as much traffic as possible according to the incoming rate (from the eNodeB) or b) if the transport is a bottleneck then this resource limitation needs to be handled on a fair way between the different Non-GBR traffic classes.

The above three issues are able to provide a homogenous QoS classification between the UE and the CN in case of IP/Ethernet transport network with WFQ priority queuing.

As discussed above, the main problem with the known scheduling mechanisms is that they cannot follow the dynamicity of the resource handling according to the evolved QoS concept. Therefore, a proposed scheduling mechanism is presented below and it is assumed that DSCP/p-bit mapping and network dimensioning is done according to the proposals described above.

The WFQ weight in the transport network nodes may be adjusted in any way (the proposed mechanism is responsible for the correct traffic classification and scheduling), but the proposed adjustment is according to the same (relative) resource distribution which is applied in the eNodeBs.

Figure 4:
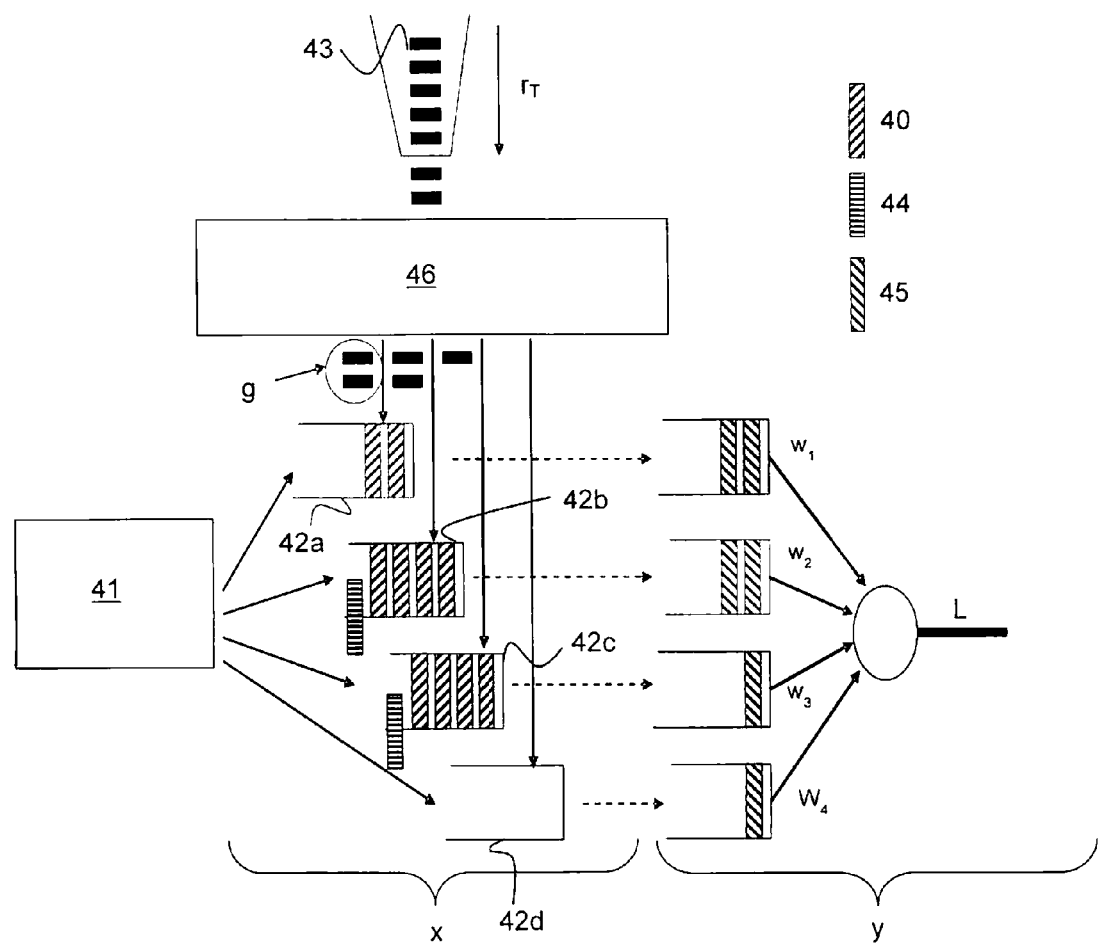
FIG. 4 shows a scheduling architecture according to the present invention.

The rough sketch of the proposed scheduling architecture is seen in FIG. 4 for the case of one GBR and three Non-GBR traffic partitions.

The detailed operation of the method is the following:

Incoming packets 40 are distributed from distribution means 41 into different queues 42*a-d* on the basis of the p-bit/DSCP fields in the headers of the packets 40. The queue 42*a* contains GBR traffic and the other queues 42*b-d* contain non-GBR traffic. The first (left sided on the figure) scheduling mechanism x provides that the GBR traffic $w_1$ will get the required resources g and the rest of the resources will be distributed between the Non-GBR classes $w_{2-4}$ in such a way that all Non-GBR classes will have the same packet loss.

Figure 3:
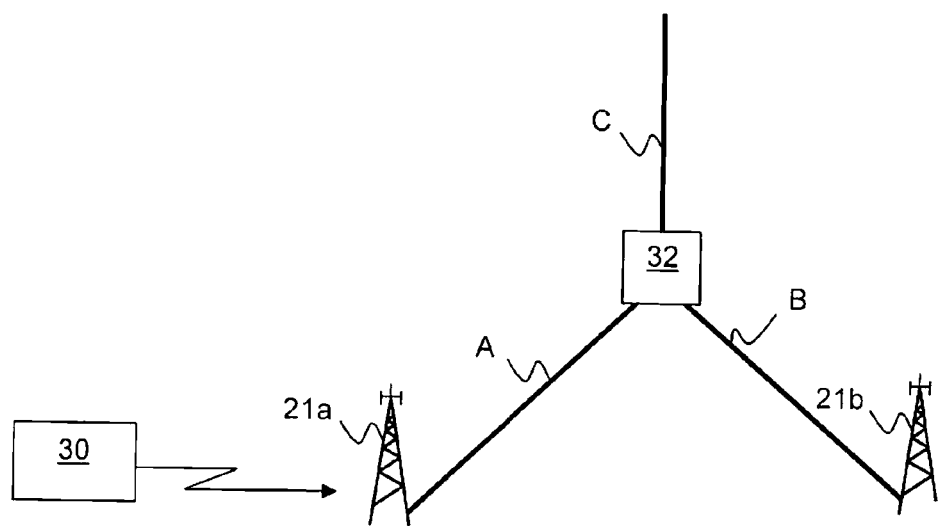
FIG. 3 illustrates a simple network topology.

The packets is only forwarded towards the WFQ scheduling part y if the current queue 42*a-d* has got enough token 43, otherwise the incoming packets are discarded, shown as dropped packets 44. The token generation rate $r_T$ is C (equal to the outgoing link rate shown in FIG. 3), which provides that the WFQ scheduling mechanism y may serve all packets (no loss) or the WFQ scheduling is not necessary any more, since the token generation rate is equal to the outgoing link capacity. Consequently all served packets may be forwarded on the outgoing link, the WFQ scheduler may cause re-ordering of packets but no packets will be dropped. Thus, the served packet (with a token) is directly forwarded to the outgoing link L having a link rate=C, these forwarded packets are denoted 45 in FIG. 4. The token distribution means 46 is arranged to distribute tokens 43 to respective queue 42*a-d* and the token rate for each traffic class is set individually based on the incoming traffic rate.

Figure 5:
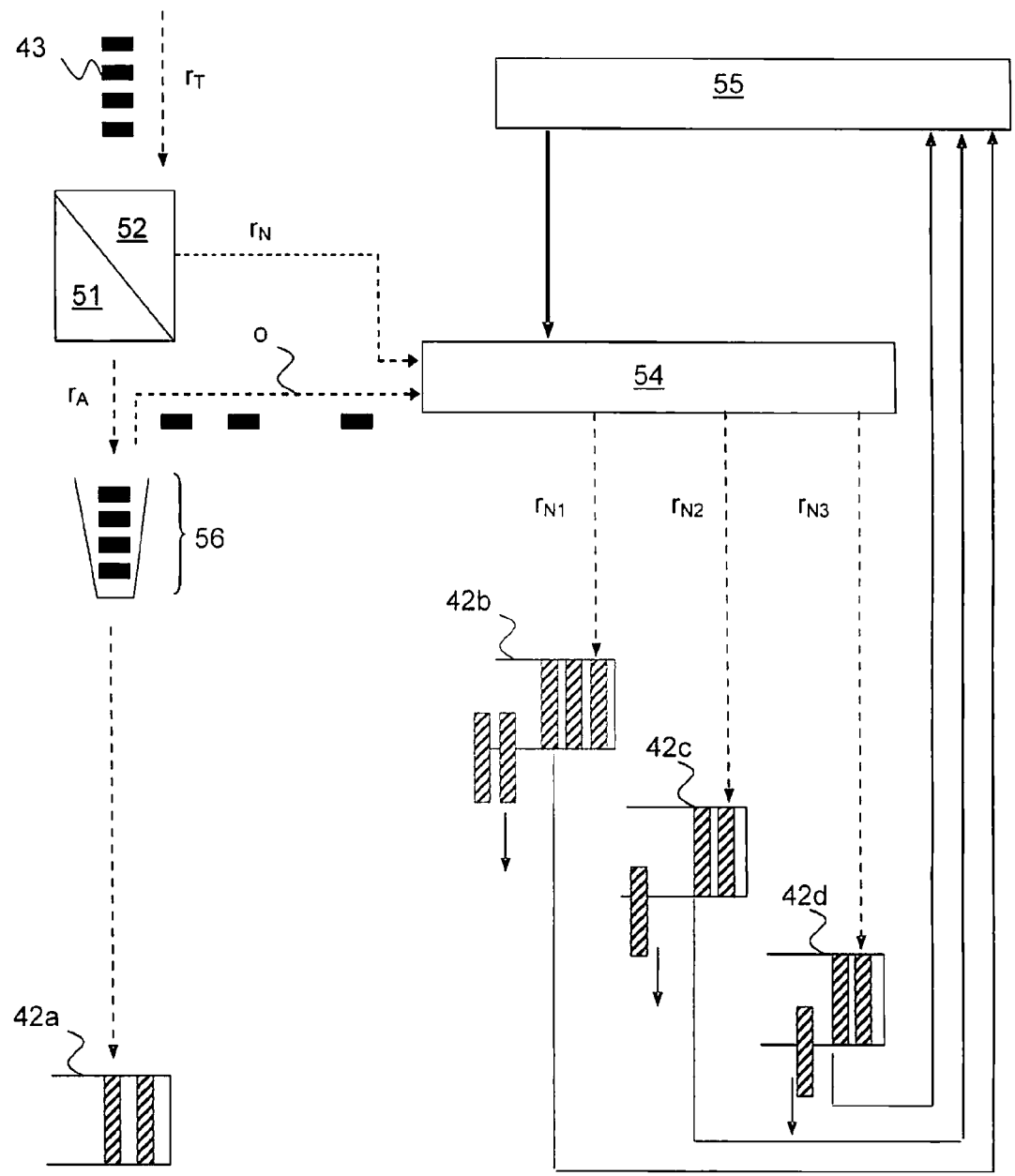
FIG. 5 shows a scheduling mechanism according to the present invention.

The novelty of the scheduling mechanism is the token distribution process (shown as 46 in FIG. 4) between the GBR 42*a* and Non-GBR 42*b-d* queues, which is seen in FIG. 5. The token rate $r_T$ for the GBR traffic class 51 is guaranteed (this comes from the guaranteed bit rate definition), because it is a requirement to provide loss-free transport for the GBR traffic (except in extraordinary situations, like multiple failures, etc). However, if the current GBR rate is less than the AAT rate, $r_A$, then the available GBR resources (tokens) 43 may be used by the Non-GBR traffic classes 52. Item 56 illustrates the GBR burst size and GBR tokens are only used when there are GBR data packets in the queue 42*a*.

As mentioned, the transport network should carry as much traffic coming from the eNodeBs as possible. If the transport is a bottleneck then the available resources is divided between the Non-GBR classes according to their rate $r_{N1-N3}$, which represents the actual resource allocation in the eNodeB/cell. The transport network follows this resource handling if the goal is to provide the QoS/resource allocation between the UE and the CN according to the evolved QoS concept.

Consequently, the token rates $r_N$ for the Non-GBR classes are based on their current (second scale average) incoming rate. Furthermore, the available GBR tokens, o, are divided among the Non-GBR classes according to the incoming rate of the Non-GBR classes. The number of usable tokens by each Non-GBR class needs to be re-calculated in a rate calculation unit 55 from time-to-time to handle the bursty behaviour of the traffic as well as the connection setups and releases. If a packet loss is occurred in Non-GBR, traffic class, while there was no traffic loss in the others, then in the next second (period) the token rate for Non-GBR, traffic class will be increased in order to equalize the packet loss among the Non-GBR traffic classes.

The measurement of the current incoming rate of the Non-GBR classes is the task of the rate calculation unit 55, which simple counts the number of incoming packets during a period in each traffic class. Then this value is forwarded to a token classifier 54, which adjusts the current token rate for the Non-GBR classes based on the measured incoming traffic rate.

The token rate calculation for a Non-GBR class is as follows:

C(N_GBR_token) denotes the default token rate for Non-GBR classes, $C(N\text{-}GBR_i)$ denotes the current measured incoming rate of N-GBR$_i$ class, while $TR(N\text{-}GBR_i)$ denotes the token rate to be calculated for N-GBR, class, and M is number of different Non-GBR classes.

$$TR(N-GBR_i) = \frac{C(N-GBR_i)}{\sum_{j \in M} C(N-GBR_j)} \cdot C(\text{N\_GBR\_token}) \quad (1)$$

If one or more Non-GBR class(-es) do not use their all available tokens then these tokens can be distributed between the N-GBR classes, which have unserved packets in their buffer based on their incoming rate. Let P denote the number of those N_GBR classes, which do not used all their tokens, let Q denote the number of those N_GBR classes, which have unserved packets in the buffer. (P+Q are not necessarily equal to M because it is possible that N_GBR classes used all tokens and their buffer is empty, all packets were served). Then, $$TR''(N-GBR_i) = \frac{C(N-GBR_i)}{\sum_{k \in Q} C(N-GBR_k)} \cdot C(\text{available } N-GBR \text{ tokens}), \quad (2)$$

$$i \in Q$$

If the current GBR rate is less than the AAT bit rate then the available tokens may also be distributed between those Non-GBR classes, which need more resources in the following way.

$$TR'''(N-GBR_i) = \frac{C(N-GBR_i)}{\sum_{i \in Q} C(N\_GBR_i)} \cdot C(\text{available } GBR \text{ tokens}), i \in Q \quad (3)$$

Then the token rate for a given Non-GBR class is simple the sum of the above rates:

TR=TR'+TR''+TR''' (4)

Obviously, the bursty behaviour of the incoming traffic causes that perfect token distribution is not possible to adjust, however in longer term, through several token rate adjustment periods the same average packet loss rate same for all Non-GBR traffic classes can be guaranteed.

Figure 6:
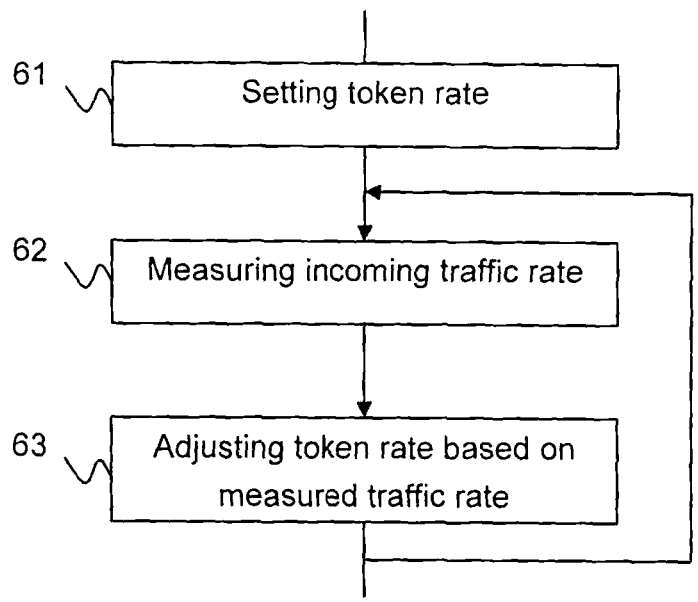
FIG. 6 is a flowchart showing the inventive method steps.

A procedure of scheduling data packets each belonging to a particular traffic class associated with a certain quality of service (QoS) level and transmitted between a first communication network node and a second communication network node, as shown in FIG. 6, is as follows:
  initially setting a token rate for assigning tokens to each traffic class (step 61);
  measuring an incoming traffic rate of each traffic class by counting a number of incoming data packets during a pre-determined period of time (step 62);
  adjusting said token rate based on said measured incoming traffic rate, in order to obtain a fair scheduling of data packets belonging to different traffic classes (step 63).

The method is applicable in eNodeB, the gateway and the transport devices, such as routers and switches, between eNodeB and the gateway in the RAN if the outgoing link capacity of the current device is lower than the sum of the incoming link capacities. That is, if all incoming links are fully loaded then the outgoing link cannot carry the traffic and losses will occur. In order to provide fair packet loss between the different traffic classes the inventive method is used. The inventive method may be used in eNodeB when the link, which connects the eNodeB to the transport network has less capacity than the radio resources handled by eNodeB.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

What is claimed is:

1. A method in a communication network node of scheduling data packets each belonging to a particular traffic class associated with a certain quality of service (QoS) level and transmitted between said communication network node and a second communication network node, comprising the steps of:
  dividing the traffic classes into a first traffic class having a high quality of service level and at least one second traffic class having a lower quality of service level than said first traffic class and wherein the first traffic class is guaranteed a certain token rate and is thus assigned a certain amount of tokens;
  initially setting a token rate for assigning tokens to each traffic class, wherein the assigned tokens for each traffic class determine whether incoming data packets within the traffic class are scheduled for transmission to the second communication node or discarded;
  measuring an incoming traffic rate of each traffic class by counting a number of incoming data packets during a pre-determined period of time;
  adjusting said token rate based on said measured incoming traffic rate, in order to obtain a fair scheduling of data packets belonging to different traffic classes; and
  using available unused tokens assigned to said first traffic class in said at least one second traffic class, if said token rate of said first traffic class is below a pre-determined threshold value.

2. A method in a communication network node of scheduling data packets each belonging to a particular traffic class associated with a certain quality of service (QoS) level and transmitted between said communication network node and a second communication network node, comprising the steps of:
  dividing the traffic classes into a first traffic class having a high quality of service level and at least one second traffic class having a lower quality of service level than said first traffic class, wherein the first traffic class is guaranteed a certain token rate and is thus assigned a certain amount of tokens and wherein when the second traffic class is divided into two or more traffic classes having different quality of service levels;
  initially setting a token rate for assigning tokens to each traffic class, wherein the assigned tokens for each traffic class determine whether incoming data packets within the traffic class are scheduled for transmission to the second communication node or discarded;

measuring an incoming traffic rate of each traffic class by counting a number of incoming data packets during a pre-determined period of time;

adjusting said token rate based on said measured incoming traffic rate, in order to obtain a fair scheduling of data packets belonging to different traffic classes; and distributing available unused tokens assigned to said first traffic class between said two or more second traffic classes, if said token rate of said first traffic class is below a pre-determined threshold value.

3. An arrangement in a communication network node for scheduling data packets each belonging to a particular traffic class associated with a certain quality of service (QoS) level and transmitted between said communication network node and a second communication network node, comprising:

a packet distribution unit configured to divide the traffic classes into a first traffic class having a high quality of service level and at least one second traffic class having a lower quality of service level than said first traffic class;

a rate calculation unit configured to measure an incoming traffic rate of each traffic class by counting a number of incoming data packets during a pre-determined period of time;

a token classifier configured to initially set a token rate for assigning tokens to each traffic class, wherein the assigned tokens for each traffic class determine whether incoming data packets within the traffic class are scheduled for transmission to the second communication node or discarded, and further configured to adjust said token rate based on the measured incoming traffic rate in order to obtain a fair scheduling of data packets belonging to different traffic classes, wherein the token classifier is configured to guarantee the first traffic class a certain token rate and to thus assign the first traffic class a certain amount of tokens and wherein the token classifier is configured to re-assign available unused tokens assigned to said first traffic class to said at least one second traffic class, if said token rate of said first traffic class is below a pre-determined threshold value.

4. An arrangement in a communication network node for scheduling data packets each belonging to a particular traffic class associated with a certain quality of service (QoS) level and transmitted between said communication network node and a second communication network node, comprising:

a packet distribution unit configured to divide the traffic classes into a first traffic class having a high quality of service level and at least one second traffic class having a lower quality of service level than said first traffic class;

a rate calculation unit configured to measure an incoming traffic rate of each traffic class by counting a number of incoming data packets during a pre-determined period of time; and a token classifier configured to initially set a token rate for assigning tokens to each traffic class, wherein the assigned tokens for each traffic class determine whether incoming data packets within the traffic class are scheduled for transmission to the second communication node or discarded, and further configured to adjust said token rate based on the measured incoming traffic rate in order to obtain a fair scheduling of data packets belonging to different traffic classes, wherein the token classifier is configured to guarantee the first traffic class a certain token rate and to thus assign the first traffic class a certain amount of tokens, and wherein when said second traffic class is divided into two or more traffic classes having different quality of service levels, wherein the token classifier is configured to distribute available unused tokens assigned to said first traffic class between said two or more second traffic classes, if said token rate of said first traffic class is below a predetermined threshold value.

* * * * *

UNITED STATES PATENT AND TRADEMARK OFFICE
CERTIFICATE OF CORRECTION

PATENT NO. : 8,750,125 B2
APPLICATION NO. : 12/738699
DATED : June 10, 2014
INVENTOR(S) : Harmatos Page 1 of 1

It is certified that error appears in the above-identified patent and that said Letters Patent is hereby corrected as shown below:

On the Title Page, Item (56), under "OTHER PUBLICATIONS", in Column 2, Line 1, delete ""QOS" and insert -- "QoS --, therefor.

On the Title Page, Item (56), under "OTHER PUBLICATIONS", in Column 2, Line 2, delete "Comunications," and insert -- Communications, --, therefor.

On the Title Page, Item (56), under "OTHER PUBLICATIONS", in Column 2, Line 3, delete "2886." and insert -- 2006. --, therefor.

In the Specification,

In Column 2, Line 42, delete "interlace" and insert -- interface --, therefor.

In Column 8, Line 41, delete "Non-GBR," and insert -- Non-GBR$_1$ --, therefor.

In Column 8, Line 43, delete "Non-GBR," and insert -- Non-GBR$_1$ --, therefor.

In Column 9, Line 23, in Equation (3), delete "$\dfrac{C(N-GBR_i)}{\sum_{i \in Q} C(N\_GBR_i)}$" and insert -- $\dfrac{C(N-GBR_i)}{\sum_{i \in Q} C(N\text{-}GBR_i)}$ --, therefor.

Signed and Sealed this
Twentieth Day of January, 2015

Michelle K. Lee
*Deputy Director of the United States Patent and Trademark Office*